United States Patent [19]

Kissick

[11] 4,358,127
[45] Nov. 9, 1982

[54] SUPPORT SYSTEM FOR A WHEELED VEHICLE

[76] Inventor: Russell P. Kissick, 391 Greenwell Rd., Cincinnati, Ohio 45238

[21] Appl. No.: 223,424

[22] Filed: Jan. 8, 1981

[51] Int. Cl.³ ............................................. B62H 1/02
[52] U.S. Cl. .................................. 280/303; 180/219; 280/293
[58] Field of Search .............. 280/293, 297, 298, 300, 280/301, 303; 254/86 H; 248/169, 171, 359; 180/219

[56] References Cited

U.S. PATENT DOCUMENTS

| | | | |
|---|---|---|---|
| 1,388,803 | 8/1921 | Craig | 280/303 |
| 1,622,383 | 3/1927 | Jeske | 280/303 |
| 4,145,069 | 3/1979 | Kissick | 280/303 |

FOREIGN PATENT DOCUMENTS 1089095 3/1955 France ................................ 280/303
608349 1/1935 Fed. Rep. of Germany ...... 280/296

*Primary Examiner*—Joseph F. Peters, Jr.
*Assistant Examiner*—Donn McGiehan
*Attorney, Agent, or Firm*—James W. Pearce; Roy F. Schaeperklaus

[57] ABSTRACT

A support system for a wheeled vehicle that includes a housing mounted on the vehicle, a pair of support arms pivotally mounted on the housing, wheels mounted on the support arms for engaging a supporting surface, and a crank arm attached to each support arm. Locking fittings pivotally mounted on the housing carry teeth engageable with teeth mounted on the crank arms to hold the crank arms in selected positions. The locking fittings are withdrawn from tooth engaged position to release the support arms for swinging movement. The support arms are swung between a raised position and a lowered vehicle supporting position. The locking fittings hold the support arms in raised position or in selected lowered position when released.

4 Claims, 15 Drawing Figures

FIG. II

SUPPORT SYSTEM FOR A WHEELED VEHICLE

This invention relates to a support system or stand for a wheeled vehicle such as a motorcycle or the like. More particularly, this invention relates to a power operated and lockable side-lean-limiting support system. The device of this invention represents an improvement over the device shown and claimed in my U.S. Pat. No. 4,145,069.

An object of this invention is to provide a power operated side-lean-limiting and support device for a motorcycle which includes support arms that can swing between a raised position free of a supporting surface and a lowered position engaging the supporting surface on both sides of the motorcycle.

A further object of this invention is to provide such a support device in which the support arms can be held at a different height for supporting the motorcycle on a sloping surface.

A further object of this invention is to provide such a support system in which the support arms are individually locked in selected positions.

Briefly, this invention provides a support system for a wheeled vehicle. A housing of the system is mounted on the vehicle. Support arms are pivotally mounted on the housing. The support arms bear on a supporting surface. A crank arm attached to each support arm carries tooth means. Locking fittings pivotally mounted on the housing include tooth means engageable with the tooth means of the crank arms to hold the crank arms in selected positions. The locking fittings can be withdrawn from tooth engaged position to release the support arms for swinging movement. The support arms swing between a raised position and a lowered vehicle supporting position. The locking fittings hold the support arms in raised position or in selected lowered position when released.

The above and other objects and features of this invention will be apparent to those skilled in the art to which this invention pertains from the following detailed description and the drawings, in which.

In the following detailed description and the drawings, like reference characters indicate like parts.

Figure 1:
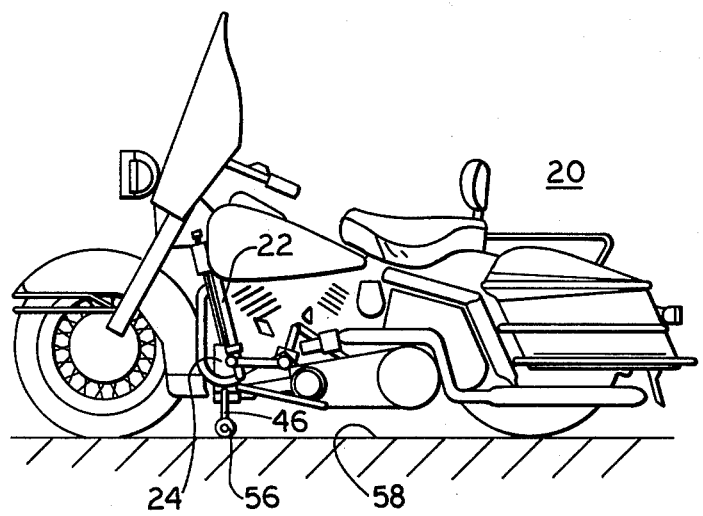
FIG. 1 is a view in side elevation of a motorcycle which is equipped with a support system constructed in accordance with an embodiment of this invention.
Figure 2:
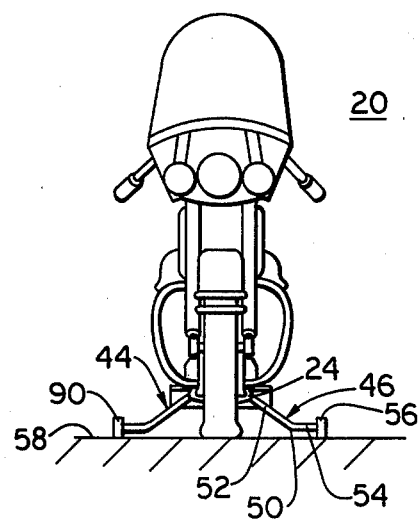
FIG. 2 is a view in front elevation of the motorcycle shown in FIG. 1, the motorcycle being parked on a level surface.
Figure 3:
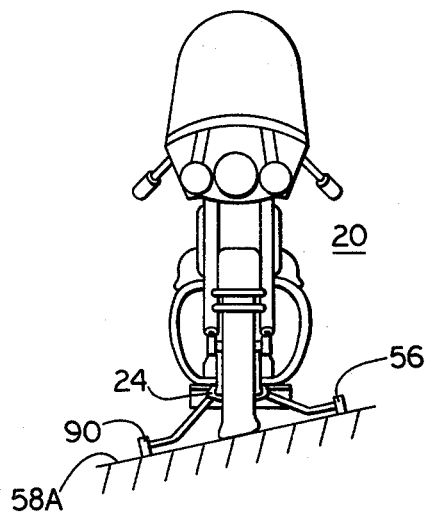
FIG. 3 is a view in front elevation of the motorcycle shown in FIG. 1, the motorcycle being parked on a sloping surface.
Figure 4:
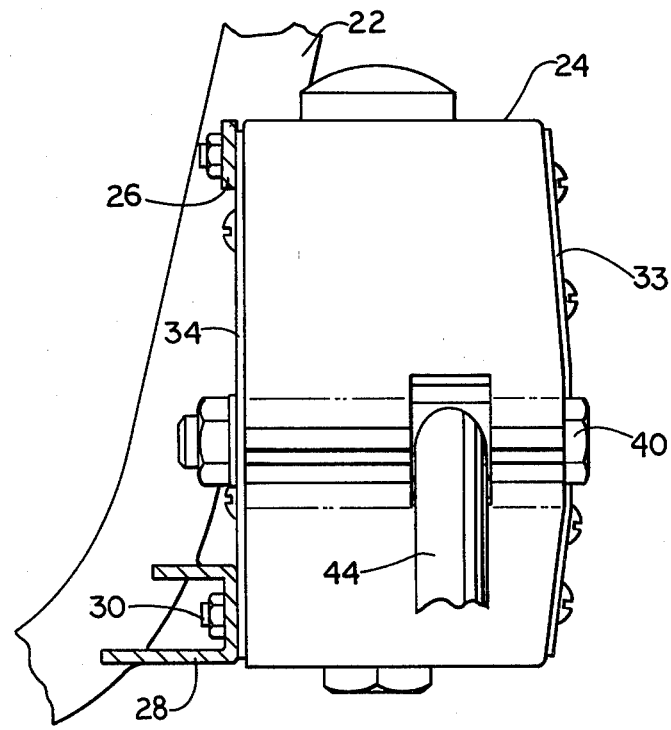
FIG. 4 is a fragmentary view of a frame element of the motorcycle showing a main housing of the system mounted thereon.
Figure 7:
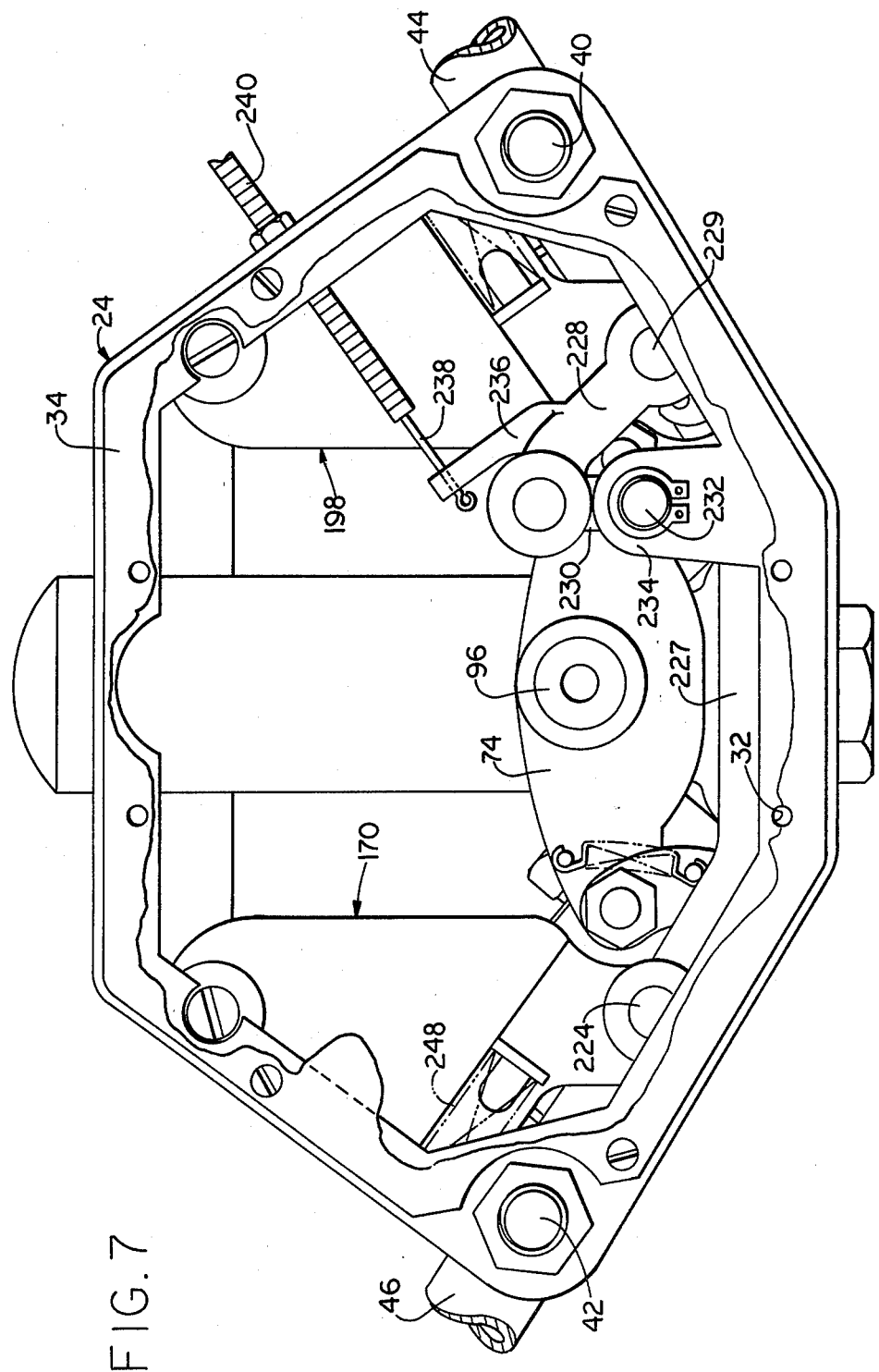
FIG. 7 is a view in rear elevation of the housing with a cover plate partly broken away.

In FIGS. 1-3 inclusive is shown a motorcycle 20 provided with frame elements 22 on which a housing 24 is mounted. The frame elements 22 carry cross brackets 26 and 28 (FIG. 4) on which the housing 24 is supported by fasteners 30. The housing 24 is provided with openings 32, one of which is shown in FIG. 7, in which the fasteners 30 are mounted. Face plates 33 and 34 (FIG. 4) close front and rear portions of the housing 24.

Horizontal pivot bolts 40 and 42 are mounted in the housing 24 and serve as pivots for lever members 44 and 46, respectively. The lever members 44 and 46 are similar in construction, and only the lever member 46 will be described in detail, some reference being made to portions of the lever member 44 where necessary to describe portions of the lever member 46 which are hidden.

Figure 11:
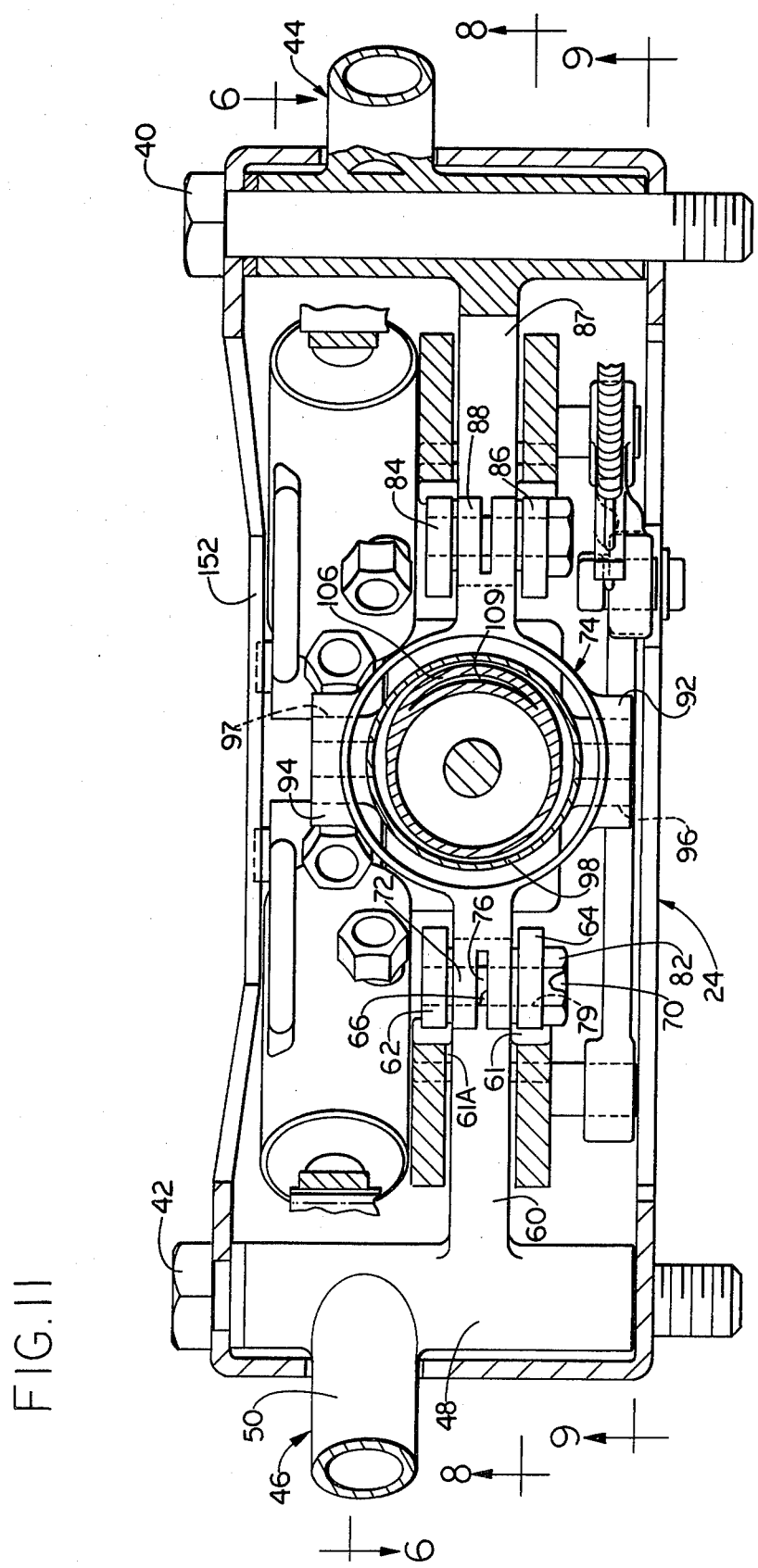
FIG. 11 is a view in section taken generally on the line 11—11 in FIG. 10.

The lever member 46 includes a sleeve 48 (FIG. 11) rotatably mounted on the pivot bolt 42. An elongated tubular wheel-support arm 50 includes a first section 52 attached to and extending radially of the sleeve 48. A second section 54 (FIG. 2) of the support arm 50 extends at an oblique angle to the first section 52. A wheel 56 is rotatably mounted on the second section 54. The wheel 56 can engage a supporting surface 58 when in a lowered position as shown in FIGS. 1 and 2. A short crank arm 60 is attached to and extends radially of the sleeve 48 in a direction opposite to the first section 52 of the support arm 50. Toothed arcs 61 and 61A (FIG. 11) are mounted on opposite sides of the short crank arm 60 near a free end thereof and spaced from the pivot bolt 42. Links 62 (FIG. 8) and 64 are pivotally connected to the crank arm 60. A stud 66 is mounted in the link 62 and extends through an opening 67 in the short crank arm 60 and through an opening (not shown) in the link 64 to receive a nut 70 (FIG. 11). The links 62 and 64 are pivotally connected to a first lug or ear 72 that is mounted on a ring or actuator member 74. A stud 76 mounted in the link 62 extends through an opening 78 in the lug 72 and through an opening 79 in the link 64. A nut 82 threaded on the stud 76 holds the links 62 and 64 and the lug 72 in assembled relation. A similar pair of links 84 and 86 connect a second lug 88 of the ring 74 to a short crank arm 87 of the lever member 44. The lever member 44 carries a rotatably mounted wheel 90. The wheel 90 can rest on the supporting surface 58.

The ring member 74 carries radially outwardly extending bearing sleeves 92 and 94. The bearing sleeves 92 and 94 receive trunnions 96 and 97, which are mounted in a sliding sleeve member or actuator 98.

The sliding sleeve member 98 is mounted for sliding lengthwise of a generally cylindrical main cylinder and guide 100. An inner cylindrical cavity 102 in the main cylinder 100 receives a piston 103. The piston 103 is connected to the sliding sleeve member 98 by a piston rod 104 so that the piston 103 moves with the sliding sleeve member 98. A nut 105 holds the piston 103 against a collar 1011 of the piston rod 104. A cap 107 closes the upper end of the sliding sleeve member 98 and supports the piston rod 104. An arcuate member 106 is attached to and extends substantially the length of the main cylinder 100 to define a passageway 109 extending along the main cylinder 100. Ends of the passageway 109 are closed by weld plugs 111 and 113. An opening 115 provides communication between the passageway 109 and the cavity 102 above the piston 103. A lower plug 108 closes the lower end of the cavity 102. A fastener 110 extends through an opening 112 in a lower panel 114 of the housing 24 and is threaded to the lower plug 108 to hold the main cylinder 100 in assembled relation in the housing 24. An upper plug 116 closes an upper end of the cavity 102. The piston rod 104 extends through an upright opening 118 in the upper plug 116 in sealed relation therewith. The sliding sleeve member 98 can extend through an opening 128 in an upper panel 130 of the housing 24. A gasket 131 attached to the upper panel 130 engages the sliding sleeve member 98 to close the opening 128.

Figure 13:
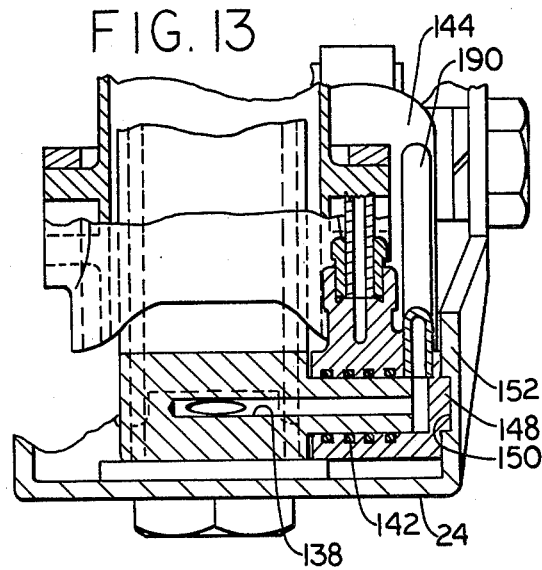
FIG. 13 is a view in section taken on the line 13—13 in FIG. 6.

Bosses 132 and 134 are formed on the lower portion of the guide 100 and are provided with transverse openings 136 and 138, which communicate with the cavity 102 and the passageway 109, respectively. The openings 136 and 138 extend along journal members 140 and 142 (FIG. 6), respectively. The journal members 140 and 142 are mounted on the guide 100. Cylinders 144 and 146 are journaled on the journal members 140 and 142, respectively. Projections 148 on the cylinders, one of which is shown in FIG. 13, can be rotatably received in bearing openings 150 in a front flange 152 of the housing 24.

The cylinders 144 and 146 are similar in construction, and only the cylinder 144 and associated structures will be described in detail, reference being made to the cylinder 146 for details not shown in connection with the cylinder 144. The cylinder 144 includes a tubular body 154 provided with a central cavity 156. A first piston member 158 and a second piston member 160 are mounted for movement along the central cavity 156. A socket 162 in the second piston member 166 slidably receives a projection 164 on the first piston member 158 so that the piston members can move independently inside the cylinder 144. A piston rod 166 is attached to the second piston member 160 and moves therewith. An eye-shaped head 167 of the piston rod 166 is pivotally mounted on a lug 168 carried by a locking fitting 170. A compression spring 172 mounted on the piston rod 166 and bearing on the second piston member 160 and on a cap fitting 174 urges the pistons of the cylinder 144 to the position shown in FIG. 6. A first hydraulic line 176 is connected to the cylinder 144 by a fitting 177 in position for introducing hydraulic fluid under the first piston member 158 of the cylinder 144. The first hydraulic line 176 is also connected to a fitting 178 of the cylinder 146 in position for introducing hydraulic fluid between pistons 160A and 158A of the cylinder 146. A second hydraulic line 180 is connected to a fitting 182 of the cylinder 144 in position for introducing hydraulic fluid between the pistons 158 and 160 of the cylinder 144 and is connected to a fitting 184 of the cylinder 146 in position for introducing hydraulic fluid under the first piston 158A of the cylinder 146. A channel 186 is mounted on the cylinder 146 and communicates between the transverse opening 138 and a central port 188, which is opposite the second piston member 160A thereof when the cylinders are in the locked position shown in FIG. 6. A similar channel 190 (FIG. 13) is mounted on the cylinder 144 and provides communication between the transverse opening 136 and a control port (not shown). A piston rod 192 of the cylinder 146 carries an eye fitting 194 which is pivotally mounted on a lug 196 of a locking fitting 198.

The locking fittings 170 and 198 are pivotally mounted on pivot pins 200 and 202, respectively. The pivot pins 200 and 202 are mounted inside the housing 24 in integral sleeve lugs 204 and 206, respectively.

Figure 8:
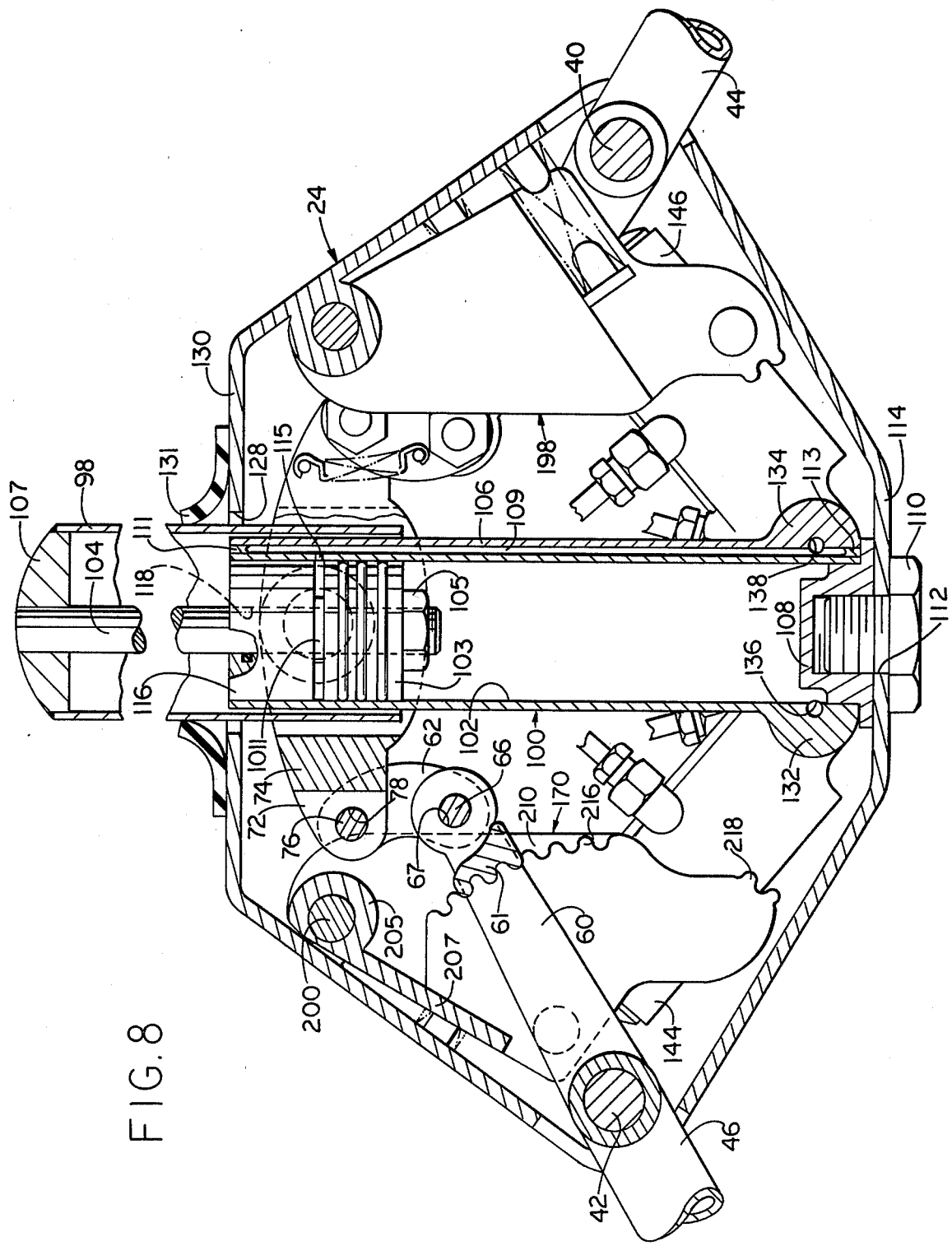
FIG. 8 is a view in section of the housing taken generally on the line 8—8 in FIG. 11.
Figure 9:
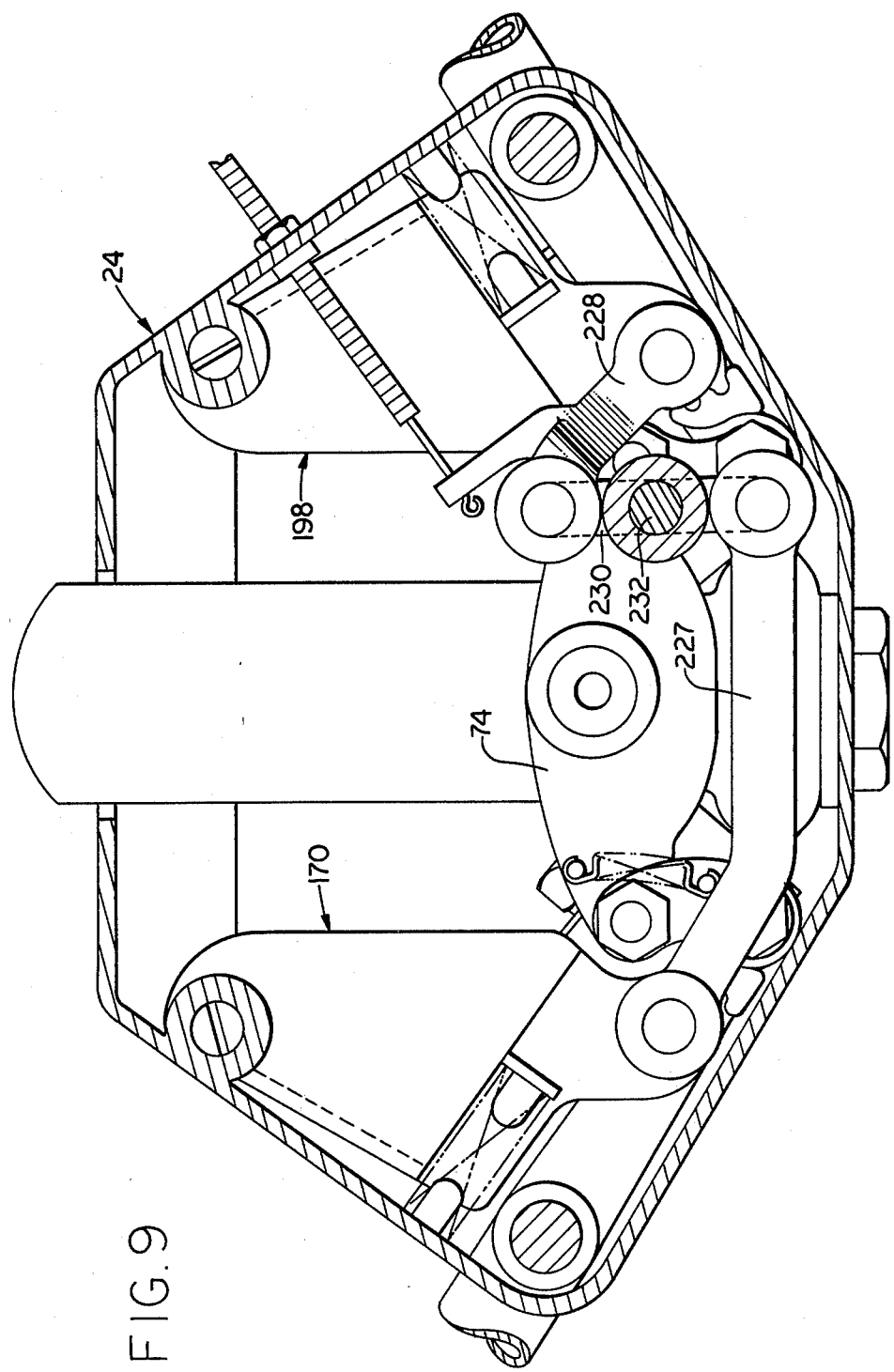
FIG. 9 is a view in section of the housing taken generally on the line 9—9 in FIG. 11.
Figure 12:
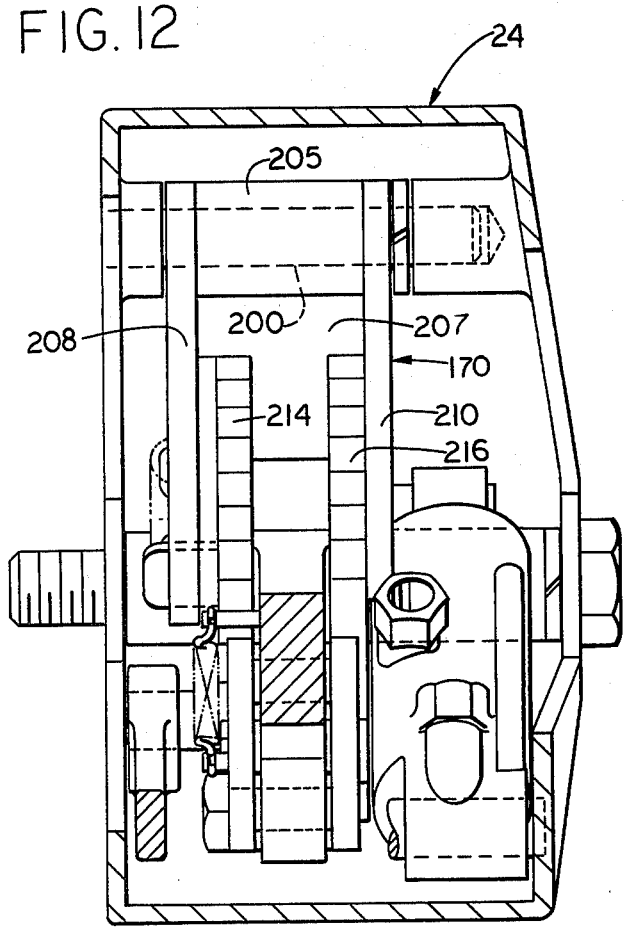
FIG. 12 is a view in section taken on the line 12—12 in FIG. 10.

The locking fittings 170 and 198 are similar in construction, and only the locking fitting 170 will be described in detail. As shown in FIGS. 8 and 12, the locking fitting 170 includes a sleeve bearing portion 205, which is rotatably mounted on the pivot pin 200. A back plate 207 and side plates 208 and 210 are mounted on the sleeve bearing portion 205. Upper toothed arcs 214 and 216 are mounted on the side plates 208 and 210, respectively. The toothed arcs 214 and 216 can engage the arcs 61 and 61A, respectively, to lock the lever member 46 in selected lowered position. Toothed arcs 218 on lower portions of the side plates 208 and 210 (one of which is shown in FIG. 8) are engageable with the toothed arcs 61 and 61A when the lever member 46 is in a raised position with the wheels 56 and 90 free of the supporting surface. When the piston rod 166 is in an extended position, the toothed arcs 61 and 61A are free so that the lever member 46 can swing between the lowered position of FIG. 8 and the raised position of FIG. 6.

The locking fittings 170 and 198 are connected to swing inwardly and outwardly in unison by a linkage including a first link 227 (FIG. 7) pivotally connected to a lug 224 mounted on the locking fitting 170, a second link 228 pivotally mounted on a lug 229 carried by the locking fitting 198, and a lever 230 pivotally connected to the links 227 and 228. The lever 230 carries a central pin 232 which is pivotally mounted in a lug 234 carried by the housing 24. The link 228 carries an anchor lug 236 to which a bowden wire 238 is connected. The bowden wire 238 runs in a casing 240 attached to and extending through the housing 24. The bowden wire 238 can be used to withdraw the link 228 to the right as shown in FIG. 7 to cause release of the locking fittings 170 and 198.

Figure 10:
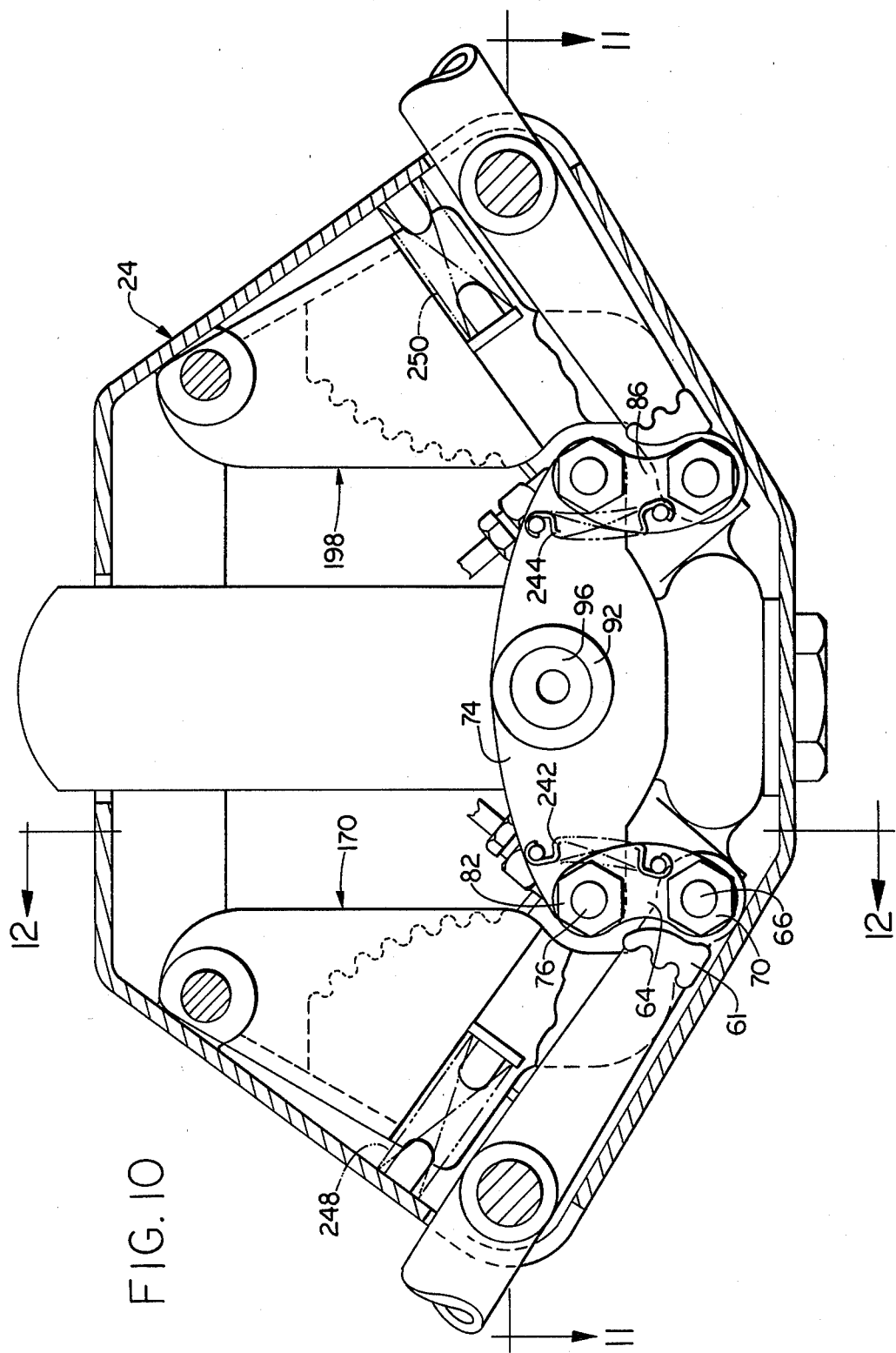
FIG. 10 is a view in section taken generally on the line 9—9, but with a cross connecting linkage removed.

The ring 74 can pivot on its trunnions 96 and 97 to permit the lever members 44 and 46 limited swinging movement independently of each other so that the wheels 56 and 90 can engage a sloping surface 58A as shown in FIG. 3. Tension springs 242 and 244 (FIG. 10) urge the ring 74 to centered position. The springs 242 and 244 connect the ring 74 to the links 64 and 86, respectively.

Compression springs 246 (FIG. 6) and 248 (FIG. 10) urge the locking fitting 170 to the locked position shown. Compression springs 250 (FIG. 10) and 252 (FIG. 6) urge the locking fitting 198 to locked position.

Figure 5:
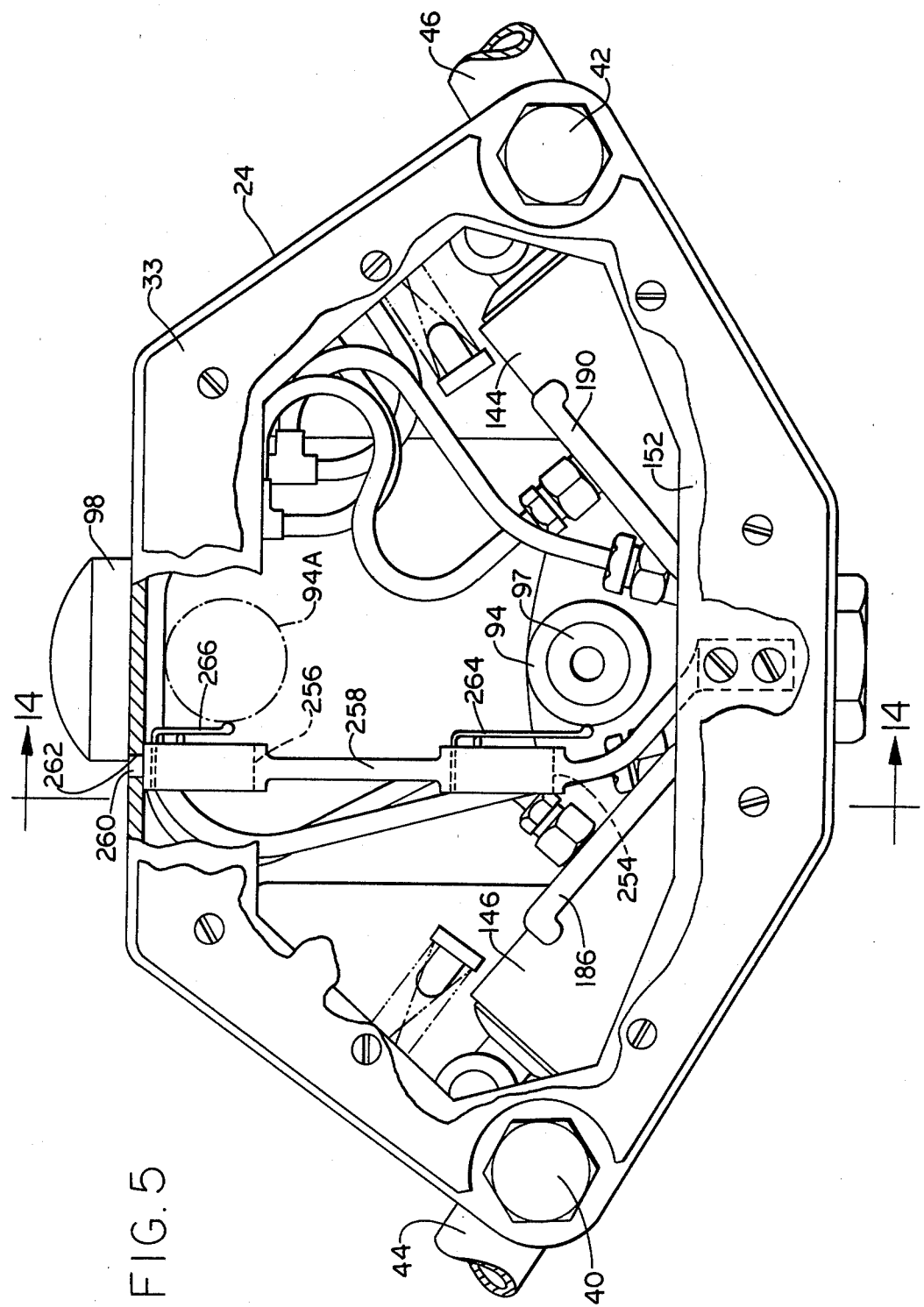
FIG. 5 is a view in front elevation of the housing with a cover plate and a flange thereof partly broken away.
Figure 14:
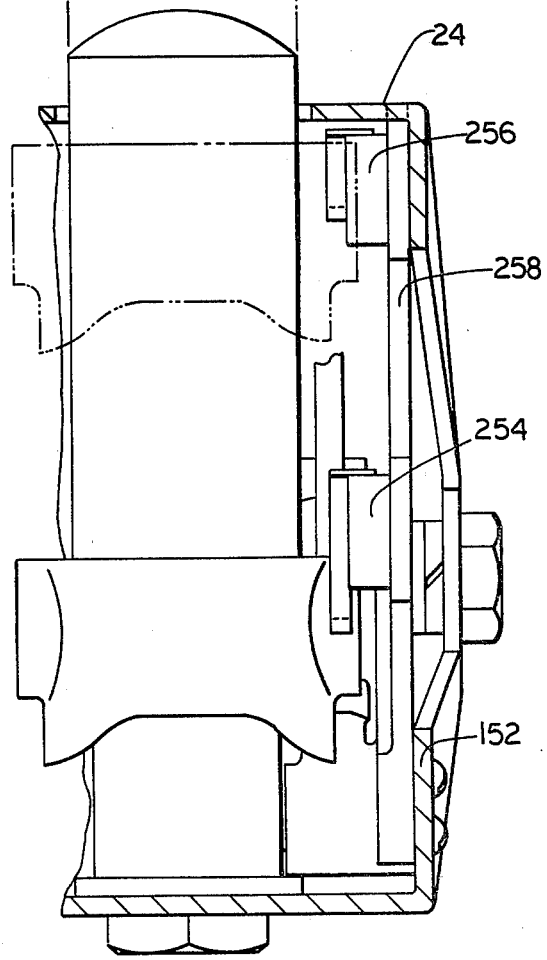
FIG. 14 is a view in section taken on the line 14—14 in FIG. 5.

Limit switches 254 and 256 are mounted on a frame 258 (FIGS. 5 and 14). A lower end portion of the frame 258 is attached to the front flange 152 of the housing 24. A projection 260 at an upper end of the frame 258 is received in an opening 262 in the housing 24. When the bearing sleeve 94 is in the lowered position shown in full lines in FIG. 5, an actuator 264 of the limit switch 254 is engaged by the bearing sleeve 94. When the bearing sleeve is in a raised position shown at 94A in dot-dash lines, an actuator 266 of the limit switch 256 is engaged thereby.

Figure 6:
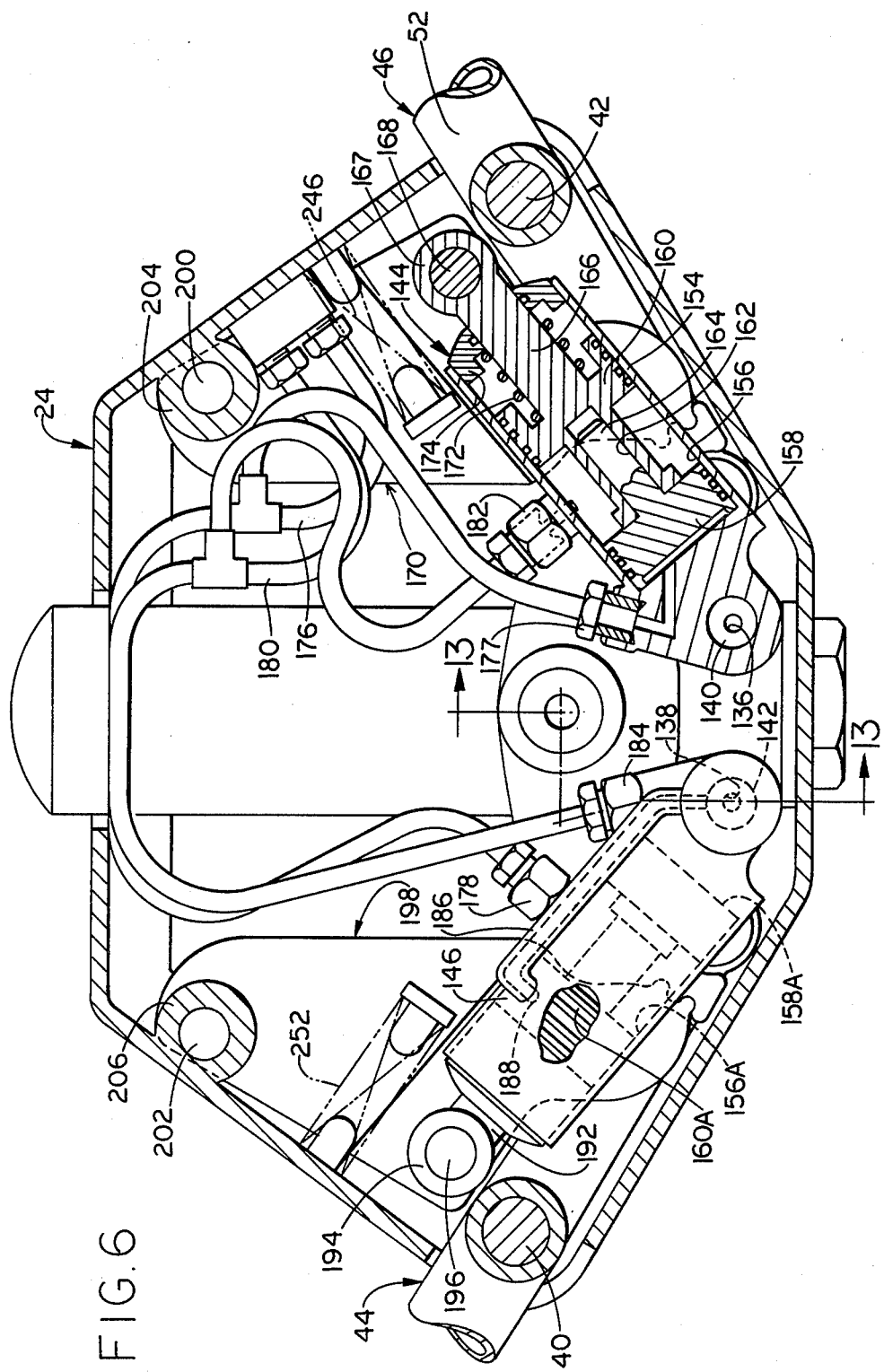
FIG. 6 is a view in section of the housing taken generally on the line 6—6 in FIG. 11.
Figure 15:
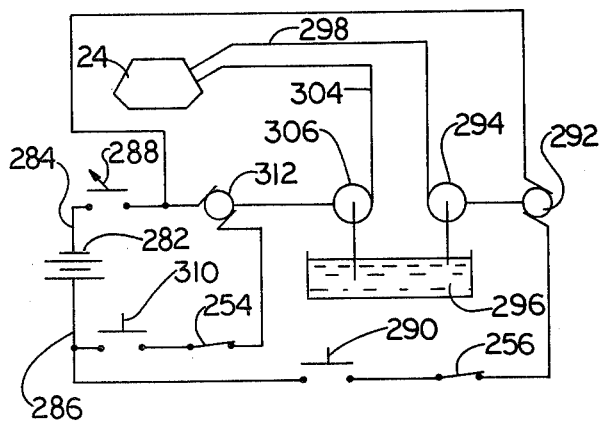
FIG. 15 is a schematic view showing electrical and hydraulic connections of the device.

Operation of the device will now be described with reference to FIG. 15, which shows electrical and hydraulic connections. Electric power is supplied by an appropriate battery 282, which may be the vehicle battery forming part of the vehicle's electrical system. The battery 282 supplies power to leads 284 and 286. The electrical portion of the system is inoperative until an on-off switch 288 is positioned in its on position. When a push button switch 290 is closed, a pump motor 292 is energized to drive a pump 294. The pump 294 draws fluid from a source 296 of fluid and directs the fluid along a line 298 and the line 180 (FIG. 6). The fluid under pressure in the line 180 enters through the fitting 182 to cause the piston 160 to advance to the right as shown in FIG. 6 to cause release of the locking fitting 170. The fluid under pressure in the line 180 also enters the cylinder 146 through the fitting 184 to advance both the piston 158A and the piston 160A to cause release of the locking fitting 198. Advance of the piston 160 of the cylinder 144 brings the cavity 156 into communication with the channel 190 (FIG. 13) to direct fluid under pressure through the opening 136 (FIG. 6) into the interior of the cylindrical cavity 102 (FIG. 8) to urge the piston 103 upwardly and to advance the ring 74 and associated linkages upwardly causing lowering of the wheels 56 and 90. Pressure from the cylindrical cavity 102 (FIG. 8) exits through the opening 115, the passageway 109, the opening 138, the channel 186 (FIG. 6), the fitting 178, the line 176, a line 304 (FIG. 15), and a pump 306 to the source 296 of fluid.

When one of the wheels 56 and 90 engages the surface 58 (FIG. 3), the ring 74 can continue to rise while swinging about its trunnions 96 and 97 until both wheels engage the supporting surface 58. Then, when the push button 290 is released, the pump motor 292 and the pump 294 stop, permitting release of the locking fittings 170 and 198 to swing inwardly under spring pressure as shown in FIG. 8 to cause the teeth 61 and 61A of the lever member 46 and similar teeth (not shown in detail) of the lever member 44 to engage teeth of the locking fittings. If the ring 74 reaches its uppermost position as shown in dot-dash lines in FIG. 5, the limit switch 256 is actuated to stop the pump motor 292 and the pump 294 to stop advance of the ring 74 in upward direction.

When a push button switch 310 is closed, a pump motor 312 is energized to drive the pump 306. The pump 306 draws fluid from the source 296 and directs the fluid along the line 304 and the line 176. The fluid under pressure in the line 176 enters through the fitting 178 to cause the piston 160A to advance to the left as shown in FIG. 6 to cause release of the locking fitting 198. The fluid under pressure in the line 176 also enters the cylinder 144 through the fitting 177 to advance both the piston 158 and the piston 160 to cause release of the locking fitting 170. Advance of the piston 160A of the cylinder 146 brings a cavity 156A into communication with the channel 186 to direct fluid under pressure from the fitting 178 through the opening 138 into the passageway 109 (FIG. 8) and through the opening 115 into the upper portion of the cavity 102 above the piston 103 to urge the piston 103 downwardly and to advance the ring 74 and associated linkages downwardly causing raising of the wheels 56 and 90. Pressure from the cavity 102 (FIG. 8) exits through the opening 136, the channel 190, the line 180, the line 298 (FIG. 15), and the pump 294 to the source 296 of fluid.

When the ring 74 reaches its lowermost position, the limit switch 254 is actuated as shown in FIG. 5 in full lines to stop the pump motor 312 and the pump 306, and the locking fittings 170 and 198 are urged inwardly as shown in FIG. 6 to latch the lever members 44 and 46 in wheel elevated position.

In the event of failure in the electrical or hydraulic systems, the locking fittings can be swung outwardly manually by means of the bowden wire 238 (FIG. 7).

The support system illustrated in the drawings and described above is subject to structural modification without departing from the spirit and scope of the appended claims.

Having described my invention, what I claim as new and desire to secure by Letters Patent is:

1. A support system for a wheeled vehicle which comprises a housing mounted on the vehicle, a pair of support arms pivotally mounted on the housing, means mounted on the support arms for engaging a supporting surface, a crank arm attached to each support arm, tooth means mounted on each crank arm, a pair of locking fittings pivotally mounted on the housing, each of the locking fittings including tooth means engageable with the tooth means of one of the crank arms to hold the crank arms in selected positions, means urging the locking fittings into tooth engaging position, means for withdrawing the locking fittings from tooth engaged position to release the support arms for swinging movement, and means for swinging the support arms between a raised position and a lowered vehicle supporting position, the locking fittings holding the support arms in selected lowered position when released.

2. A support system as in claim 1 in which the means for swinging the support arms includes a first actuator member movable transversely of the pivots of the support arms, a second actuator member pivotally mounted on the first actuator member, and means linking the crank arms and the second actuator member.

3. A support system as in claim 1 in which the means for withdrawing the locking fittings includes first cylinder means and the means for swinging the support arms includes second cylinder means, and the first and second cylinder means are connected so that the first cylinder means is actuated before the second cylinder means.

4. A support system as in claim 3 in which the first cylinder means includes first piston means and second piston means and the first piston means withdraws the locking fittings and actuates valving means to direct actuating fluid to the second cylinder means following withdrawing of the locking fittings.

* * * * *